United States Patent
Jeon et al.

(10) Patent No.: US 7,236,126 B2
(45) Date of Patent: Jun. 26, 2007

(54) AGPS SYSTEM USING NTP SERVER AND METHOD FOR DETERMINING THE LOCATION OF A TERMINAL USING A NTP SERVER

(75) Inventors: Ji-Youn Jeon, Seoul (KR); Jong-Sun Pyo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 145 days.

(21) Appl. No.: 11/190,544

(22) Filed: Jul. 27, 2005

(65) Prior Publication Data

US 2006/0125685 A1    Jun. 15, 2006

(30) Foreign Application Priority Data

Dec. 13, 2004    (KR) ...................... 10-2004-0104848

(51) Int. Cl.
*G01S 1/00* (2006.01)
*H02B 7/185* (2006.01)
(52) U.S. Cl. ............................. 342/357.09; 342/357.01
(58) Field of Classification Search ........... 342/357.09, 342/357.01, 357.15
See application file for complete search history.

(56) References Cited

U.S. PATENT DOCUMENTS

2003/0085837 A1    5/2003    Abraham
2004/0162084 A1    8/2004    Wang

FOREIGN PATENT DOCUMENTS

EP    1431848    6/2004

OTHER PUBLICATIONS

Universal Mobile Telecommunications System (UMTS); Requirements for Support Assisted Global Positioning System (A-GPS); Frequency Division Duplex (FDD), Sep. 2004.
Mills, Improved Algorithms for Synchronizing Computer Network Clocks, IEEE/ACM Transactions on Networking, Jun. 1, 1995.

*Primary Examiner*—Thomas H. Tarcza
*Assistant Examiner*—Nga X. Nguyen
(74) *Attorney, Agent, or Firm*—The Farrell Law Firm

(57) ABSTRACT

Disclosed is a method for determining the location of a terminal in an AGPS system in a wireless LAN using AGPS data provided from a PDE (position determination entity) and time information provided from a NTP (network time protocol) server.

18 Claims, 5 Drawing Sheets

| LI | VN | MODE | STRATUM | POLL | PRECISION |
|----|----|------|---------|------|-----------|
| ROOT DELAY ||||||
| ROOT DISPERSION ||||||
| REFERENCE IDENTIFIER ||||||
| REFERENCE TIMESTAMP (64) ||||||
| ORIGINATE TIMESTAMP (64) ||||||
| RECEIVE TIMESTAMP (64) ||||||
| TRANSMIT TIMESTAMP (64) ||||||
| KEY IDENTIFIER (OPTIONAL) (32) ||||||
| MESSAGE DIGEST (OPTIONAL) (128) ||||||

FIG.2

AGPS SYSTEM USING NTP SERVER AND METHOD FOR DETERMINING THE LOCATION OF A TERMINAL USING A NTP SERVER

PRIORITY

This application claims priority to an application entitled "AGPS System Using NTP Server and Method for Determining Location of Terminal Using AGPS System" filed with the Korean Intellectual Property Office on Dec. 13, 2004 and assigned Serial No. 2004-104848, the contents of which are incorporated herein by reference.

BACKGROUND OF THE INVENTION

1. Field of the Invention

The present invention relates to an AGPS (Assisted Global Positioning System), and more particularly to an AGPS system using an NTP (Network Time Protocol) server for providing synchronized time information in a wireless LAN, and a method for determining the location of a terminal using the AGPS system.

2. Description of the Related Art

Many companies are racing to develop new wireless technologies that can be used to provide communication services, such as wireless Internet access, regardless of location. Wireless networking is on the rise with the ever-increasing need for wireless Internet access. Wireless LANs (Local Area Networks) use radio or infrared waves, instead of network cables or telephone wires, to communicate information between networked devices such as computers, minimizing the need for wired connections and thereby reducing the time and cost associated with network installations. Wireless LANs provide users with mobile access to the network in a specified radio coverage area. The user mobility and flexibility of wireless LANs enable mobile networks, or networks that can be accessed while on the move. Due to the rapidly evolving mobile communication technologies and the explosive increase in the use of mobile phones, wireless LAN technologies have developed rapidly.

Users can access a wireless LAN through portable devices such as PDAs or notebook computers to use Internet services within a specified distance from an access point ("AP"). Although no cables or wires are required, the portable devices should be fitted with wireless LAN cards for network access using radio frequency signals.

A conventional wireless LAN is installed as illustrated in FIG. 1. General network and data communication in a system using wireless LAN technology will be explained with reference to FIG. 1. A wireless LAN, as shown in FIG. 1, consists of terminals 100 capable of wireless Internet access, an access point 110 and a network 120. The terminals 100 can be PDAs or notebook computers with a wireless LAN card to access the wireless LAN and use the Internet services. The access point 110 functions as a repeater that enables wireless Internet access. Each terminal can use services such as Internet access via the access point 110. The terminals 100 may communicate with the access point 110 using infrared light or radio frequency.

Among a variety of wireless Internet services available on mobile terminals, such as cell phones or PDAs, location-based services ("LBS") are becoming more and more popular due to its many practical applications and wide availability. LBS can be used in various applications and conditions, such as traffic information and car navigation. To use LBS, the mobile terminal location needs to be known. GPS is widely used to track the exact location of a mobile terminal.

Two methods are commonly used to receive GPS signals from GPS satellites. One method, generally used in conventional terminals, is a stand-alone GPS that calculates GPS satellite orbits and pseudo distances to the satellites using a GPS chipset or module mounted on a terminal circuit and determines the location of the object terminal without any information exchange with an external assistance server. The other is an assisted GPS ("AGPS") method that has recently become popular as an attractive option for providing accurate location. AGPS uses a mobile network to reduce the initialization time that a normal GPS receiver needs to receive navigation data. In AGPS, information about satellite orbits and errors previously measured by a base station is provided to the terminal through a communication means. The GPS chipset or module mounted in the terminal determines the location of the terminal in a short time using the data received from the base station and the calculated pseudo distance from the GPS satellites.

Since satellite orbit information and correction information are transmitted from a position determination entity ("PDE"), installed in the base station, to a mobile station, AGPS ensures faster response times than stand-alone GPS and can track GPS signals even in weak signal conditions such as downtown areas or indoors.

When location or time information is not provided, a mobile terminal has to track search spaces with frequencies and codes of all GPS satellites to acquire GPS signals and calculate its location. AGPS combines rough location and time information from the mobile network with satellite orbit information to predict the GPS satellites currently in view with the Doppler shifts for the visible satellites to reduce the number of searchable satellites and speed up the response. Knowledge of currently operating satellites reduces the number of satellites to search for and reduces response times.

For data exchange with a system providing location determination services using a GPS in a wireless LAN, synchronized accurate time information is used. When the synchronized time information is obtained, a GPS receiver can determine its location using the AGPS data and time information provided by the network, thereby reducing the time-to-first-fix ("TTFF") and improving sensitivity. However, it is difficult to implement an AGPS system in a wireless LAN unless there is a solution to obtain synchronized time.

In a conventional system providing location services, a terminal having a wireless LAN function can obtain AGPS data necessary to determine its location from a position determination entity by accessing the network through an access point, but cannot obtain synchronized time information. To implement an AGPS system in a wireless LAN, a solution to obtain synchronized time is required.

SUMMARY OF THE INVENTION

Accordingly, the present invention has been made to solve the above-mentioned problems occurring in the prior art, and an object of the present invention is to provide an AGPS (Assisted Global Positioning System) system for providing synchronized time information using an NTP (Network Time Protocol) server in a wireless LAN and thereby enabling accurate determination of the location of a mobile terminal and a method for determining the location of a mobile terminal using the AGPS system.

In accordance with one aspect of the present invention for accomplishing the above object, there is provided an AGPS system using an NTP (Network Time Protocol) server in a wireless LAN, that includes a terminal for sending an AGPS data requesting message and a time information requesting message using a wireless LAN function and determining current location thereof based on AGPS data and time information received in response to the messages; an access point for analyzing a message received from the terminal, delivering the message to a corresponding server according to the results of analysis and delivering a message received from the server to the terminal; a position determination entity for generating AGPS data in response to an AGPS data requesting message received from the access point and providing the generated AGPS data to the access point; and an NTP server for generating time information in response to a time information requesting message received from the access point and providing the generated time information to the access point.

In accordance with another aspect of the present invention, there is provided a method for determining the location of a mobile terminal in an AGPS system using an NTP (Network Time Protocol) server in a wireless LAN, that includes, when a terminal generates an AGPS data requesting message and a time information requesting message to use location-based services, sending the generated messages to an access point; when the access point receives the messages from the terminal, analyzing the received messages and delivering the respective messages to a position determination entity and an NTP server according to the results of analysis; delivering response messages received respectively from the position determination entity and the NTP server to the terminal; and determining the location of the terminal based on the response messages received from the access point.

BRIEF DESCRIPTION OF THE DRAWINGS

The above and other objects, features and advantages of the present invention will be more apparent from the following detailed description taken in conjunction with the accompanying drawings, in which:

FIG. 2 illustrates an NTP (Network Time Protocol) message format;

DETAILED DESCRIPTION OF THE PREFERRED EMBODIMENT

Figure 1:
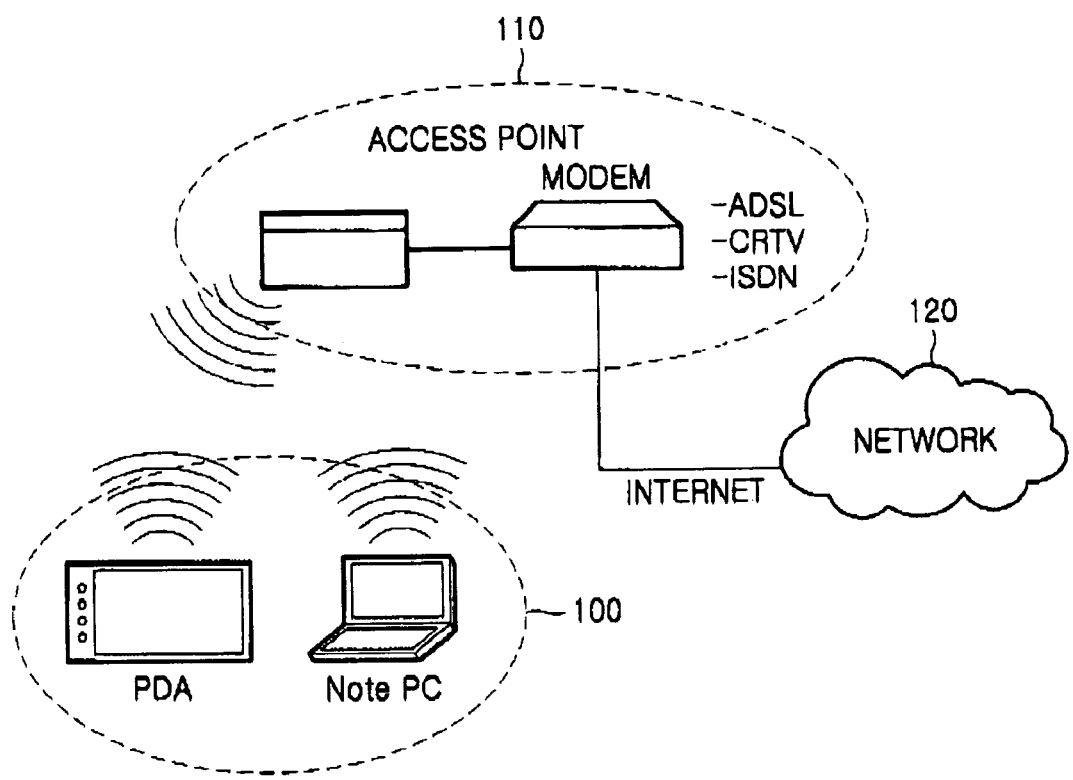
FIG. 1 illustrates a general network and data communication in a conventional system using a wireless LAN.

Hereinafter, preferred embodiments of the present invention will be described with reference to the accompanying drawings. In the drawings, the same element, although depicted in different drawings, will be designated by the same reference numeral or character. Also, in the following description of the present invention, a detailed description of known functions and configurations incorporated herein will be omitted when it may make the subject matter of the present invention unclear.

The present invention provides a method for determining the location of a mobile terminal in an AGPS system based on AGPS data received from a PDE (Position Determination Entity) and synchronized time information received from a NTP (Network Time Protocol) server.

The NTP is a protocol widely used to synchronize clocks on network elements ("NE") connected via a network. As an Internet standard, the NTP provides time accuracy of 1 to 50 ms depending on synchronization technology and network traffic. A network element designated as a time server, i.e., an NTP server, is provided with a receiver. The local clock on each terminal networked to the NTP server can be synchronized using a protocol such as the NTP, which eliminates the need to mount receivers in all of the terminals.

An NTP message is preferably constructed as shown in FIG. 2. Since the same NTP message format is used by a client and a server, protocol modes are classified to identify the NTP server and the NTP client.

The NTP format consists of data fields that include a "ROOT DELAY" indicating the total round delay to the primary reference NTP server, a "ROOT DISPERSION" indicating the normal error relative to the primary reference NTP server, a "REFERENCE TIMESTAMP" specifying the local time at which the local clock was last set or corrected, an "ORIGINAL TIMESTAMP" specifying the local time at which the request departed the client for the server, a "RECEIVE TIMESTAMP" specifying the local time at which the request arrived at the server, and a "TRANSMIT TIMESTAMP" specifying the local time at which the reply departed the server for the client. An NTP message includes information about time and delay factors. Since the NTP client and the NTP server record and transmit the status of their clocks, a delay can be estimated on the basis of the time elapsed after transmission.

If the NTP and a time server are used, synchronized time information can be acquired even in a system that uses a wireless LAN technology to access a network.

Figure 3:
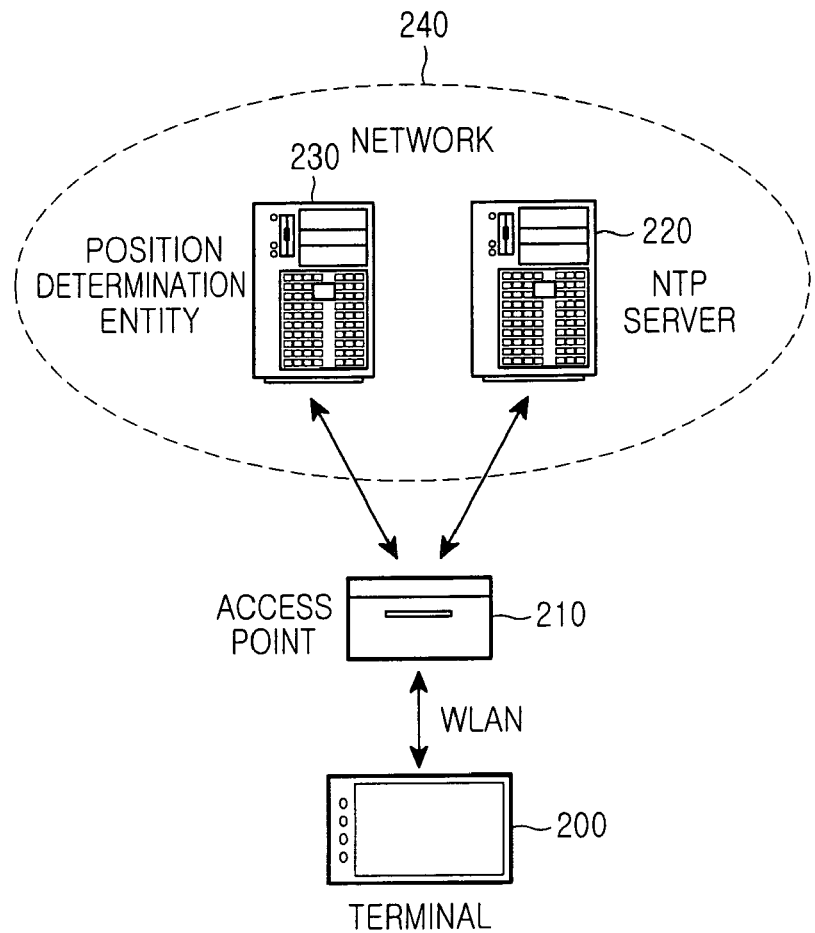
FIG. 3 is a block diagram of an AGPS system using an NTP server in a wireless LAN according to an embodiment of the present invention.

FIG. 3 is a block diagram of an AGPS system using an NTP server in a wireless LAN according to an embodiment of the present invention. The AGPS system will be explained in detail with reference to FIG. 3.

The AGPS system is composed of a terminal 200, an access point ("AP") 210 and a network 240 including an NTP server 220 and a position determination entity 230.

The terminal 200 can be a mobile device such as a cell phone, a PDA or a notebook computer. In the AGPS system using a wireless LAN, the terminal 200 accesses the network 240 using wireless LAN technology. In this connection, the access point 210 is used as a bridge connecting the terminal 200 to the network 240. The access point 210 enables data communication between the terminal 200 and the position determination entity 230 and NTP server 220 included in the network 240.

When the user inputs a request for location services on the terminal 200, the terminal 200 generates an AGPS data requesting message with regard to its location and sends the generated message to the position determination entity 230. To be specific, the terminal 200 accesses the network 240 through the access point 210 to send the AGPS data requesting message to the position determination entity 230.

The position determination entity 230 receives the AGPS data requesting message from the terminal 200 via the access point 210. In response to the message, the position determination entity 230 generates requested AGPS data. The AGPS data includes satellite ephemeris data, current GPS time, GPS running information and rough location of the user having the terminal 200. The position determination entity 230 sends the AGPS data to the access point 210 which will then deliver the received AGPS data to the terminal 200.

When the user inputs a request for location services, the terminal 200 also generates a time information requesting message to obtain synchronized time information, as well as the AGPS data requesting message. The terminal 200 sends the time information requesting message to the NTP server 220, while sending the AGPS data requesting message to the position determination entity 230. The two messages are sent to the NTP server 220 and the position determination entity 230 through the access point 210.

Upon receiving the time information requesting message, the NTP server 220 sends requested time information to the terminal 200 through the access point 210 using the wireless LAN technology.

As explained above, the terminal 200 receives AGPS data from the position determination entity 230 and time information from the NTP server 220 using the wireless LAN technology. The terminal 200 determines its initial location in a short time based on the AGPS data and the time information. With the reduction of time to wait until the GPS receiver computes a navigation solution, the initialization time of the GPS receiver is drastically reduced. As a result, the terminal 200 can speed up the determination of its initial location using received GPS signals.

Figure 4:
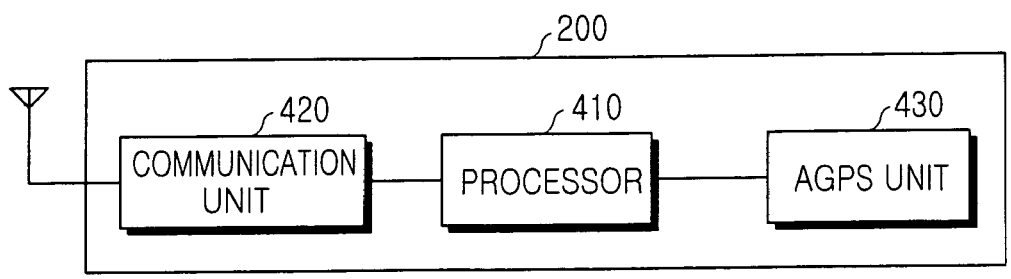
FIG. 4 is a block diagram of an AGPS terminal with a wireless LAN function according an embodiment of to the present invention.

Hereinafter, operation of the terminal 200 with a wireless LAN function will be explained in detail. FIG. 4 is a block diagram of an AGPS terminal with a wireless LAN function according to an embodiment of the present invention. Referring to FIG. 4, the terminal 200 includes a processor 410, a communication unit 420 and an AGPS unit 430.

The communication unit 420 implements the wireless LAN function that enables access to the network 240 through the access point 210 to share network resources. The communication unit 420 transmits the AGPS data received from the position determination entity 230 and the time information received from the NTP server 220 to the AGPS unit 430 under the control of the processor 410.

The processor 410 controls the operations to calculate the initial location of the terminal 200 using the GPS signals.

The AGPS unit 430 functions to accurately receive GPS signals from the GPS satellites using the AGPS data and time information received from the communication unit 420. The AGPS unit 430 is involved in sending an AGPS data requesting message to the position determination entity 230 and a time information requesting message to the NTP server 220. The AGPS unit 430 detects the initial GPS location upon receiving requested AGPS data and time information, and calculates the current location of the terminal 200 using the GPS signals.

Since the terminal 200 uses AGPS data received from the position determination entity 230 and time information received from the NTP server 220 in the AGPS system in a wireless LAN, it can rapidly calculate its current location, drastically reducing the GPS initialization time.

Hereinafter, a format of data exchanged between the terminal 200 and the position determination entity 230 in the AGPS system in a wireless LAN will be explained in detail with reference to FIG. 5. In the AGPS system according to an embodiment of the present invention, the terminal 200, the access point 210 and the position determination entity 230 all preferably exchange data in the format illustrated in FIG. 5.

The data format consists of a protocol ID field 500, a real data size field 510 and a real data message field 520. The protocol ID is protocol information predefined to be used to send specific data from the terminal 200 to the position determination entity 230 through the access point 210, or from the position determination entity 230 to the terminal 200 through the access point 210. Since data exchanged between the terminal 200, access point 210 and position determination entity 230 is AGPS data, the protocol ID field 500 specifies a protocol for AGPS data communications. When the terminal 200 sends an AGPS data requesting message to the position determination entity 230 through the access point 210, information indicating that the message is a request for AGPS data is contained in the protocol ID field 500. On the other hand, when the position determination entity 230 sends AGPS data to the terminal 200 through the access point 210, information indicating that AGPS data is being sent is contained in the protocol ID field 500.

The real data size field 510 specifies the size of data to be sent to the position determination entity 230 through the access point 210 from the terminal 200 or to the terminal 200 through the access point 210 from the position determination entity 230. The real data message field 520 contains real data to be sent to the position determination entity 230 through the access point 210 from the terminal 200 or to the terminal 200 through the access point 210 from the position determination entity 230.

As explained above, it is possible to identify a protocol for AGPS data communications between the terminal 200 and the position determination entity 230 from the protocol ID field 500. When the terminal 200 obtains real AGPS data having a size specified in the real data size field 510, it uses the AGPS data for the initial location determination through the GPS. The AGPS data provided from the position determination entity 230 of the network 240 includes GPS satellite ephemeris data, current GPS time, GPS running information and rough location of the user having the terminal 200. The IS-801 Telecommunication Industry Association/Electronics Industry Association (TIA/EIA) (2001.2) standard can be referred to for a better understanding of real AGPS data.

Hereinafter, a format of data exchanged between the terminal 200 and the NTP server 220 in the AGPS system in a wireless LAN will be explained in detail with reference to FIG. 6. In the AGPS system according to an embodiment of the present invention, the terminal 200, the access point 210 and the NTP server 220 all preferably exchange data in the format illustrated in FIG. 6.

Figure 6A:
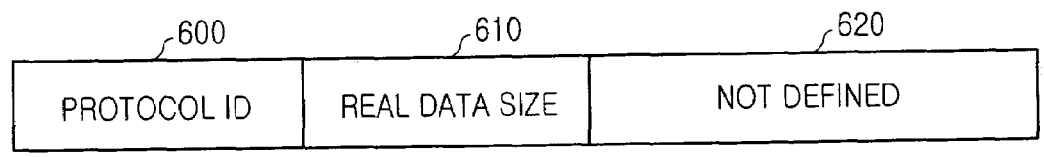
FIG. 6 illustrates a format of data exchanged between a terminal, an access point and an NTP server according to an embodiment of the present invention.
Figure 6B:
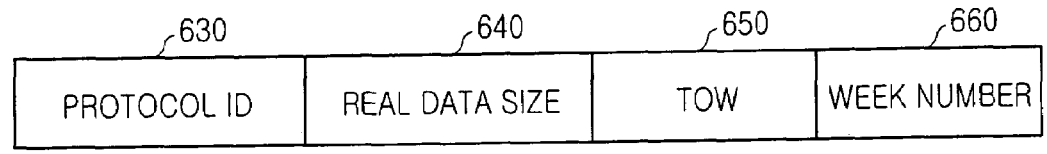
Figure 7:
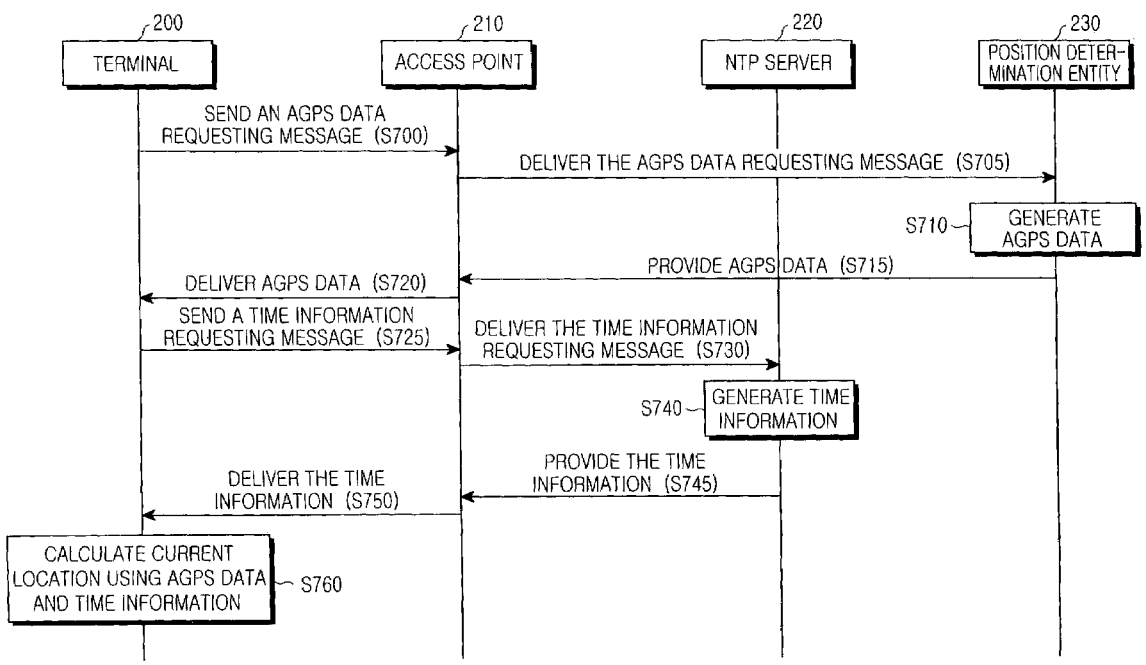
FIG. 7 is a flow chart illustrating the signal processing in an AGPS system using an NTP server according to an embodiment of the present invention.

FIG. 6A illustrates the format of a time information requesting message that is sent from the terminal 200 to the NTP server 220 through the access point 210. FIG 6B illustrates the format of a response message that is sent from the NTP server 220 to the terminal 200 through the access point 210 in response to the time information requesting message.

When the user inputs a request for location services, the terminal 200 sends a time information requesting message to the NTP server 220 through the access point 210 after sending an AGPS data requesting message to the position determination entity 230 through the access point 21. In other words, the terminal 200 generates a time information requesting message to obtain time information provided from the NTP server 220. This message has a format consisting of a protocol ID 600 specifying the message as a mere request, a not-defined field 620 containing no real data and a data size 610 specifying that the real data size is 0.

From the protocol ID 600, the NTP server 220 recognizes that the received message is a request for time information. Then the NTP server 220 sends a response message including time information and having the format illustrated in FIG. 6B to the terminal 200.

Referring to FIG. 6B, the response message format consists of a protocol ID 630, a real data size 640, a time of week ("TOW") 650 and a week number 660.

The TOW field 650 contains highly accurate UTC (Universal Time Coordinated) in atomic seconds. The TOW field 650 specifies time in seconds from Sunday 00:00:00 h UTC. The week number field 660 contains a Z-count which is a 29-bit binary number representing the fundamental GPS time unit. The 10 most significant bits represent the GPS week number. The GPS week refers to the number of elapsed weeks since the week beginning Jan. 6, 1980. The week number increments at Saturday/Sunday midnight in GPS time. The real data size field 640 in the response message specifies the total size of the TOW field 650 and the week number field 660.

The NTP client according to the present invention, i.e., the terminal 200, sends a time information requesting message to the NTP server 220 to receive accurate current time. After exchanging request and response messages, the terminal 200 can calculate a link delay and a clock offset relative to the server and thereby adjust its clock to be in sunc with the server clock.

An AGPS system using an NTP server and a method for determining the location of a terminal in the AGPS system have been explained with reference to FIGS. 3 to 7. In relation to the location determination, a signal processing in the AGPS system will be explained in detail with reference to the flow chart of FIG. 7.

Figure 5:
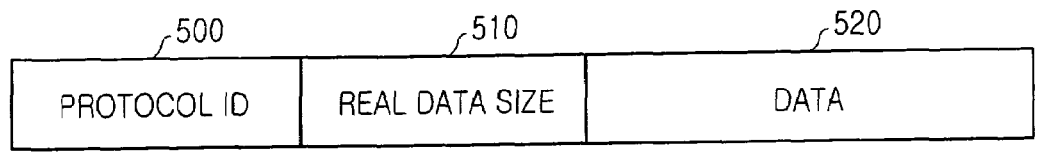
FIG. 5 illustrates a format of data exchanged between a terminal, an access point and a position determination entity according to an embodiment of the present invention.

When the user inputs a request for location services, the terminal 200 sends an AGPS data requesting message having the format illustrated in FIG. 5 to the access point 210 at step S700. The access point 210 then delivers the received message to the position determination entity 230 at step S705. More specifically, the access point 210 recognizes that the message received from the terminal 200 is a request for AGPS data in view of the protocol ID included in the message format. Then the access point 210 delivers the AGPS data requesting message to the position determination entity 230.

The position determination entity 230 analyzes the AGPS data requesting message received through the access point 210. As a result of the analysis, the position determination entity 230 recognizes that the message is sent from the terminal 200 to request AGPS data. Thus, the position determination entity 230 generates AGPS data in response to the request message at step S710 and proceeds with step S715 to send the generated AGPS data to the access point 210 using wireless LAN technology. The access point 210 then delivers the AGPS data received from the position determination entity 230 to the terminal 200 at step S720.

In addition to the AGPS data requesting message, the terminal 200 generates a time information requesting message to obtain time information necessary to calculate its location and sends the time information requesting message to the access point 21 using the wireless LAN technology at step S725. The time information message has the format as shown in FIG. 6A. The access point 210 delivers the time information requesting message received from the terminal 200 to the NTP server 220 at step S730.

The NTP server 220 analyzes the message received through the access point 210. Upon recognizing that the message is a request for exchange of accurate current times, the NTP server 220 generates a response message with the requested time information in the format of FIG. 6B at step S740. At step S745, the NTP server 220 sends the response message to the access point 210. At step S750, the access point 210 delivers the response message received from the NTP server 220 to the terminal 200. At step S760, the terminal 200 calculates its current location through the GPS based on the AGPS data received from the position determination entity 230 and the time information received from the NTP server.

In other words, upon receiving the AGPS data and the time information through the process explained above, the terminal 200 accurately and rapidly detects the initial GPS location and thereby calculates its current location.

An assisted GPS technology is applied to a system for providing GPS-based location services, thereby greatly reducing the time to wait for the GPS receiver to compute a navigation solution and determine a current location. The AGPS system can also solve problems, such as route deviation and map-matching errors, that may be caused when the GPS navigation solution is not computed for a long time in weak signal environments.

According to an embodiment of the present invention, a mobile terminal that accesses a network through a wireless LAN function can acquire synchronized time information using an NTP server even in a system that does not provide accurate time synchronized with the network. Therefore, when the NTP server is used, an AGPS system can be implemented in a wireless LAN, efficiently taking advantage of the wireless LAN.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An AGPS (Assisted Global Positioning System) system using a NTP (Network Time Protocol) server in a wireless LAN, which comprises:
   a terminal for sending an AGPS data requesting message and a time information requesting message using a wireless LAN and for determining a current location based on AGPS data and time information received in response to the requesting messages;
   an access point for analyzing messages for the position determination entity and the time information received from the terminal, delivering the message to a corresponding server according to results of the analysis and for delivering a message received from the server to the terminal;
   a position determination entity for generating AGPS data in response to the AGPS data requesting message received from the access point and for providing the generated AGPS data to the access point; and
   another separate NTP server for generating synchronized time information in response to the time information requesting message received from the access point and providing the generated time information to the access point.

2. The AGPS system as claimed in claim 1, wherein said access point delivers the AGPS data requesting message received from the terminal to the position determination entity and the time information requesting message received from the terminal to the NTP server.

3. The AGPS system as claimed in claim 1, wherein said AGPS data requesting message has a format consisting of a protocol ID field specifying the AGPS data requesting message as a request for AGPS data, a real data message field and a real data size field specifying a size of the real data message.

4. The AGPS system as claimed in claim 1, wherein said AGPS data provided from the position determination entity has a format consisting of a protocol ID field which specifies the AGPS data as a response to the AGPS data requesting message, a real data message field and a real data size field specifying a size of the real data message.

5. The AGPS system as claimed in claim 1, wherein said time information requesting message has a format consisting of a protocol ID field specifying the time information requesting message as a request for time information, a not-defined field and a real data size field specifying a size of the not-defined field.

6. The AGPS system as claimed in claim 1, wherein said time information has a format consisting of a protocol ID field which specifies the time information as synchronized time information from the NTP server, a TOW (Time of Week) field containing UTC (Coordinated Universal Time), a week number field containing 10 bits representing a GPS week number and a real data size field specifying a total size of the TOW field and the week number field.

7. The AGPS system as claimed in claim 6, wherein said TOW field specifies time in seconds from Sunday and the week number field contains a Z-count which is a 29-bit binary number representing a fundamental GPS time unit and of which the 10 most significant bits represent a GPS week number.

8. The AGPS system as claimed in claim 3, wherein said access point analyzes the protocol ID field of a received message and sends the received message to the corresponding server or the terminal according to the results of the analysis.

9. The AGPS system as claimed in claim 4, wherein said access point analyzes the protocol ID field of a received message and sends the received message to the corresponding server or the terminal according to the results of the analysis.

10. The AGPS system as claimed in claim 5, wherein said access point analyzes the protocol ID field of a received message and sends the received message to the corresponding server or the terminal according to the results of the analysis.

11. The AGPS system as claimed in claim 6, wherein said access point analyzes the protocol ID field of a received message and sends the received message to the corresponding server or the terminal according to the results of the analysis.

12. The AGPS system as claimed in claim 1, wherein said terminal includes:
a communication unit for implementing the wireless LAN;
an AGPS unit for detecting an initial GPS location based on the AGPS data and time information delivered from the communication unit and calculating the current location of the terminal using GPS signals; and
a processor for delivering the AGPS data and time information received from the access point to the AGPS unit and controlling operations necessary to calculate the initial location of the terminal using the GPS signals.

13. A method for determining the location of a mobile terminal in an AGPS (Assisted Global Positioning System) system using a NTP (Network Time Protocol) server in a wireless LAN, which comprises the steps of:
when a terminal generates an AGPS data requesting message and a time information requesting message to use location-based services, sending the generated requesting messages to an access point;
when the access point receives messages from the terminal, analyzing the received messages and delivering respective messages to a position determination entity and a NTP server according to results of the analysis;
delivering response messages received from the position determination entity and the NTP server to the terminal; and
determining a location of the terminal based on the response messages.

14. The method as claimed in claim 13, wherein said AGPS data requesting message has a format consisting of a protocol ID field specifying the AGPS data requesting message as a request for AGPS data, a real data message field and a real data size field specifying the size of the real data message.

15. The method as claimed in claim 13, wherein said time information requesting message has a format consisting of a protocol ID field specifying the time information requesting message as a request for time information, a not-defined field and a real data size field specifying the size of the not-defined field.

16. The method as claimed in claim 14, wherein said step of analyzing the received messages and delivering the respective messages comprises:
analyzing the protocol ID field of the message received from the terminal;
when the received message is recognized as a request for AGPS data as a result of the protocol ID analysis, delivering the message to the position determination entity; and
when the received message is recognized as a request for time information as a result of the protocol ID analysis, delivering the message to the NTP server.

17. The method as claimed in claim 15, wherein said step of analyzing the received messages and delivering the respective messages comprises:
analyzing the protocol ID field of the message received from the terminal;
when the received message is recognized as a request for AGPS data as a result of the protocol ID analysis, delivering the message to the position determination entity; and
when the received message is recognized as a request for time information as a result of the protocol ID analysis, delivering the message to the NTP server.

18. The method as claimed in claim 13, wherein said response messages are a message containing synchronized time information provided from the NTP server and a message containing APGS data provided from the position determination entity in response to the requesting messages received through the access point.

* * * * *